United States Patent

Huang et al.

Patent Number: 6,052,384
Date of Patent: Apr. 18, 2000

[54] USING A RECEIVER MODEL TO MULTIPLEX VARIABLE-RATE BIT STREAMS HAVING TIMING CONSTRAINTS

[75] Inventors: Si Jun Huang, Suwanee, Ga.; Christopher H. Birch, Toronto, Canada

[73] Assignee: Scientific-Atlanta, Inc., Norcross, Ga.

[21] Appl. No.: 08/823,007

[22] Filed: Mar. 21, 1997

[51] Int. Cl.[7] .......................................................... H04N 7/00
[52] U.S. Cl. .......................... 370/468; 370/537; 370/538
[58] Field of Search ..................................... 370/385, 387, 370/390, 398, 423, 465, 476, 477, 537, 538, 468; 348/404, 405, 419

[56] References Cited

U.S. PATENT DOCUMENTS

| | | |
|---|---|---|
| 4,636,858 | 1/1987 | Hague et al. . |
| 5,159,447 | 10/1992 | Haskell et al. . |
| 5,216,503 | 6/1993 | Paik et al. . |
| 5,461,619 | 10/1995 | Citta et al. . |
| 5,479,498 | 12/1995 | Brandman et al. . |
| 5,506,844 | 4/1996 | Rao . |
| 5,537,148 | 7/1996 | Fujinami . |
| 5,543,853 | 8/1996 | Haskell et al. . |
| 5,550,589 | 8/1996 | Shiojiri et al. . |
| 5,561,791 | 10/1996 | Mendelson et al. . |
| 5,566,208 | 10/1996 | Balakrishnan ........................... 348/419 |
| 5,594,729 | 1/1997 | Kanakia et al. . |
| 5,598,415 | 1/1997 | Nuber et al. . |
| 5,650,825 | 7/1997 | Naimpally et al. ...................... 348/461 |
| 5,652,627 | 7/1997 | Allen ........................................ 348/404 |
| 5,677,969 | 10/1997 | Auyeung et al. ........................ 348/419 |
| 5,686,963 | 11/1997 | Uz et al. ................................... 348/404 |
| 5,708,664 | 1/1998 | Budge et al. ............................. 370/465 |
| 5,719,632 | 2/1998 | Hoang et al. ............................ 348/419 |
| 5,835,493 | 11/1998 | Magee et al. ............................ 370/477 |
| 5,838,686 | 11/1998 | Ozkan ...................................... 370/465 |
| 5,862,140 | 1/1999 | Shen et al. . |
| 5,877,812 | 3/1999 | Krause et al. . |

OTHER PUBLICATIONS

*Background Information on MPEG–1 and MPEG–2 Television Compression*, found in Nov. 1996 at the URL http://www.cdrevolution.com/text/mpeginfo.htm.

*Video Transmission Over Broadband Networks*, found in URL http://www–dse.doc.ic.ac.uk/~nd/surprise96/journal/vol4/arad/report.html.

*DiviCom MPEG–2 ReMultiplexer*, Divicom, Inc., Milpitas, CA.

*CLI Techno Trends, The Next Step in Digital Broadcast*: Compression Labs, Inc. 1996.

"Statistical Multiplexing of Multiple MPEG–2 Video Programs in a Single Channel", Mike Perkins & David Arnstein, SMPTE Journal, Sep. 1995, p. 596.

"Multiplexing of Variable Rate Encoded Streams", Barry G. Haskell & Amy R. Reibman, IEEE Transactions on Circuits and Systems for Video Technology, vol. 4, No. 4, Aug. 1994, p. 417.

"Constraints on Variable Bit–Rate Video for ATM Networks", Barry G. Haskell & Amy R. Reibman, IEEE Transactions on Circuits and Systems for Video Technology, vol. 2, No. 4, Dec. 1992, p. 361.

*Primary Examiner*—Chi H. Pham
*Assistant Examiner*—Frank Duong
*Attorney, Agent, or Firm*—Kenneth M. Massaroni; Hubert J. Bardhardt III; Kelly Gardner

[57] ABSTRACT

Techniques for determining an output rate for a bit stream, the output rate being determined by applying information read from the bit stream to a model of a receiver for the bit stream. The techniques are employed to construct a statistical multiplexer that multiplexes varying bit-rate MPEG-2 bit streams onto a satellite up-link. Minimum and maximum output rates for each MPEG-2 bit stream are determined such that neither a queue for the bit stream in the multiplexer nor the bit stream's decoder will underflow or overflow. The rates with regard to the decoder are determined using timing information read from the bit stream and a general model of an MPEG-2 decoder. The multiplexer first allocates each bit stream its minimum bandwidth and then allocates any remaining bandwidth to the bit streams in proportion to the difference between the minimum and maximum output rates for the bit streams, with no bit stream receiving more than its maximum output rate. If there is not enough bandwidth to give every bit stream its minimum rate, bit rates are allocated according to priorities assigned to the bit streams.

23 Claims, 10 Drawing Sheets

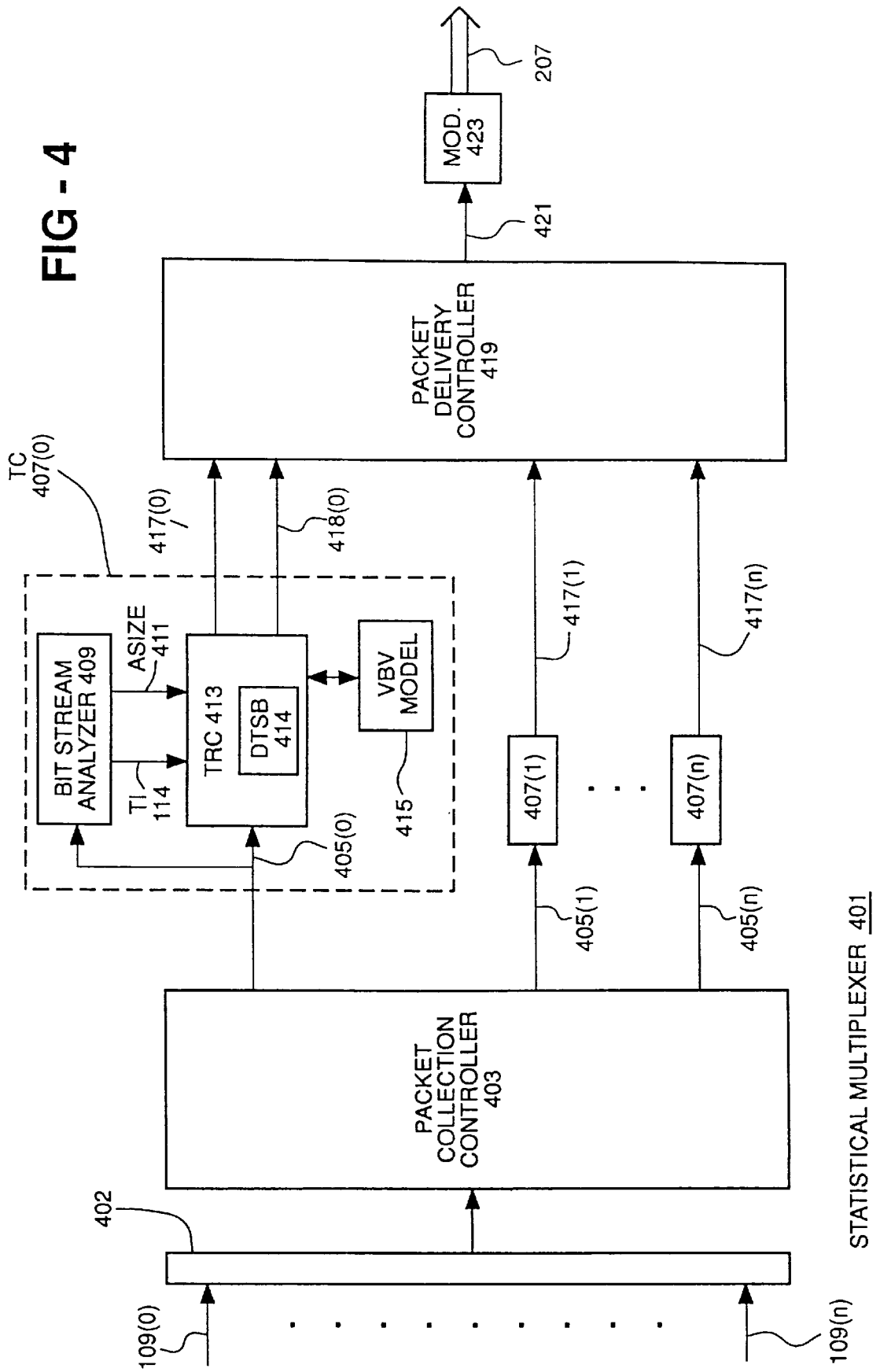

FIG - 6

```
/* Initialization of parameters */
q = 0;                      /* q is the index of coded picture that is leaving SMB */
r = 0;                      /* r is the index of coded picture that is leaving VBV */
pic_cnt_VBV = 0;            /* picture counter in VBV buffer */
pic_residue_bits = packet_cnt(0)*188;   /* Initial condition when no bit has left SMB */
Fvbv(0) = 0;                /* Decoder's VBV fullness is empty at the beginning */
```
⎱ 603

```
for (m = 1; ; m++) {        /* m is the index of each channel transmission time Tc*/ pic_residual_bits -= R(m)*Tc ;    /* update the pic_residual_bits parameter in SMB */
                                      /* Rm is the bitrate for the mth Tc period */
```
⎱ 605

```
    /* VBV fullness update */
    if (t < DTS(r)) {       /* The picture r has not be removed from VBF. Here the t is the real
                               time dervied from PCR */
        Fvbv(m) += R(m)*Tc ;
```
⎱ 609

```
    }
    else {                  /* picture r has been completely removed from VBV */
        pic_cnt_VBV--;      /* The number of coded picture in VBV should be reduced by 1 */
        Fvbv (m) += R(m)* Tc - packet_cnt(r)*188;
        r = (r + 1) % NPPmax;
```
⎱ 611

```
                            /* Note: the VBV fullness calculated in this way has the TS and PES overhead.
                               It means the actual fullness of decoder's bit buffer is less than VBV fullness.
                               We don't intend to exclude such overhead since it is rather tedious. Instead
                               we use this overhead as an extra small buffer at the top of decoder's bit
                               buffer to guarantee there is no overflow */
    } if (pic_residual_bits < 0) {   /* last coded picture has been completely moved from
                                      SBM to VBV */
```
⎱ 613

```
        /* Update the maximum DTS value and picutre counter information in VBV */
        DTS_V max = DTS(q);        /* The maximum DTS value in VBV */
        pic-cnt_VBV ++;            /* Number of complete coded picture in VBV */
```
⎱ 615

```
        /* Update parameters for SMB */
        q = (q + 1) % NPP          /* next q value q has the same value range as NPP */
        pic_residual_bits += packet_cnt(q)*188;   /* add in the bits amount for the new picture */
    }
}
```
⎱ 617

601

USING A RECEIVER MODEL TO MULTIPLEX VARIABLE-RATE BIT STREAMS HAVING TIMING CONSTRAINTS

BACKGROUND OF THE INVENTION

1. Field of the Invention

The invention has to do with the transmission of variable-rate bit streams, generally and more particularly with the efficient time multiplexing of several such bit streams onto a transmission medium.

2. Description of the Prior Art: FIGS. 1–3

A new problem in data transmission is the transmission of data that requires a high band width, is bursty, and has temporal constraints. Traditionally, data transmission has been done on the public switched networks provided by the telephone companies and on packet networks. The public switched networks are designed for interactive voice applications, and so provide relatively low-bandwidth circuits that satisfy stringent temporal constraints. The packet networks are designed for the transfer of data between computer systems. The only constraint is that the data eventually arrive at its destination. The amount of bandwidth available for a transfer depends on the degree of congestion in the network. The packet networks thus typically make no guarantees whatever about when or even in what order the data in a burst of data will arrive at its destination. As may be seen from the foregoing, neither the telephone network nor the packet network is well-adapted to handle high-bandwidth bursty data with time constraints. An example of such data is digital television which has been compressed according to the MPEG-2 standard. For details on the standard, see *Background Information on MPEG-1 and MPEG-2 Television Compression*, which could be found in November 1996 at the URL http://www.cdrevolution.com/text/mpeginfo.htm.

FIG. 1 shows those details of the MPEG-2 standard that are required for the present discussion. The standard defines a encoding scheme for compressing digital representations of video. The encoding scheme takes advantage of the fact that video images generally have large amounts of spatial and temporal redundancy. There is spatial redundancy because a given video picture has areas where the entire area has the same appearance; the larger the areas and the more of them there are, the greater amount of spatial redundancy in the image. There is temporal redundancy because there is often not much change between a given video image and the ones that precede and follow it in a sequence. The less the amount of change between two video images, the greater the amount of temporal redundancy. The more spatial redundancy there is in an image and the more temporal redundancy there is in the sequence of images to which the image belongs, the fewer the bits that will be needed to represent the image.

Maximum advantage for the transmission of images encoded using the MPEG-2 standard is obtained if the images can be transmitted at variable bit rates. The bit rates can vary because the rate at which a receiving device receives images is constant, while the images have varying number of bits. A large image therefore requires a higher bit rate than a small image, and a sequence of MPEG images transmitted at variable bit rates is a variable-rate bit stream with time constraints. For example, a sequence of images that shows a "talking head" will have much more spatial and temporal redundancy than a sequence of images for a commercial or MTV song presentation, and the bit rate for the images showing the "talking head" will be far lower than the bit rate for the images of the MTV song presentation.

The MPEG-2 compression scheme represents a sequence of video images as a sequence of pictures, each of which must be decoded at a specific time. There are three ways in which pictures may be compressed. One way is intra-coding, in which the compression is done without reference to any other picture. This encoding technique reduces spatial redundancy but not time redundancy, and the pictures resulting from it are generally larger than those in which the encoding reduces both spatial redundancy and temporal redundancy. Pictures encoded in this way are called I-pictures. A certain number of I-pictures are required in a sequence, first, because the initial picture of a sequence is necessarily an I-picture, and second, because I-pictures permit recovery from transmission errors.

Time redundancy is reduced by encoding pictures as a set of changes from earlier or later pictures or both. In MPEG-2, this is done using motion compensated forward and backward predictions. When a picture uses only forward motion compensated prediction, it is called a Predictive-coded picture, or P picture. When a picture uses both forward and backward motion compensated predictions, it is called a Bidirectional predictive-coded picture, or a B picture in short. P pictures generally have fewer bits than I pictures and B pictures have the smallest number of bits. The number of bits required to encode a given sequence of pictures in MPEG-2 is thus dependent on the distribution of picture coding types mentioned above, as well as the picture content itself. As will be apparent from the foregoing discussion, the sequence of pictures required to encode the images of the "talking heads" will have fewer and smaller I pictures and smaller B and P pictures than the sequence required for the MTV song presentation, and consequently, the MPEG-2 representation of the images of the talking heads will be much smaller than the MPEG-2 representation of the images of the MTV sequence.

The MPEG-2 pictures are being received by a low-cost consumer electronics device such as a digital television set or a set-top box provided by a CATV service provider. The low cost of the device strictly limits the amount of memory available to store the MPEG-2 pictures. Moreover, the pictures are being used to produce moving images. The MPEG-2 pictures must consequently arrive in the receiver in the right order and with time intervals between them such that the next MPEG-2 picture is available when needed and there is room in the memory for the picture which is currently being sent. In the art, a memory which has run out of data is said to have underflowed, while a memory which has received more data than it can hold is said to have overflowed. In the case of underflow, the motion in the TV picture must stop until the next MPEG-2 picture arrives, and in the case of overflow, the data which did not fit into memory is simply lost.

FIG. 1 is a representation of a digital picture source 103 and a television 117 that are connected by a channel 114 that is carrying a MPEG-2 bit stream representation of a sequence of TV images. In system 101, a digital picture source 103 generates uncompressed digital representations of images 105, which go to variable bit rate encoder 107. Encoder 107 encodes the uncompressed digital representations to produce variable rate bit stream 109. Variable rate bit stream 109 is a sequence of compressed digital pictures 111 of variable length. As indicated above, when the encoding is done according to the MPEG-2 standard, the length of a picture depends on the complexity of the image it represents and whether it is an I picture, a P picture, or a B picture. Additionally, the length of the picture depends on the encoding rate of VBR encoder 107. That rate can be varied.

In general, the more bits used to encode a picture, the better the picture quality.

Bit stream 109 is transferred via a channel 114 to VBR decoder 115, which decodes the compressed digital pictures 111 to produce uncompressed digital pictures 105. These in turn are provided to television 117. If television 117 is a digital television, they will be provided directly; otherwise, there will be another element which converts uncompressed digital pictures 105 into standard analog television signals and then provides those signals to television 117. There may of course be any number of decoders 115 receiving the output of a single encoder 107.

In FIG. 1, channel 114 transfers bit stream 109 as a sequence of packets 113. The compressed digital pictures 111 thus appear in FIG. 1 as varying-length sequences of packets 113. Thus, picture 111(d) has n packets while picture 111(a) has k packets. Included in each picture 111 is timing information 112. Timing information 112 contains two kinds of information: clock information and time stamps. Clock information is used to synchronize decoder 115 with encoder 107. The time stamps specify when a picture is to be decoded and when it is actually to be displayed. The times specified in the time stamps are specified in terms of the clock information. As indicated above, VBR decoder 115 contains a relatively small amount of memory for storing pictures 113 until they are decoded and provided to TV 117. This memory is shown at 119 in FIG. 1 and is termed in the following the decoder's bit buffer. Bit buffer 119 must be at least large enough to hold the largest possible MPEG-2 picture. Further, channel 114 must provide the pictures 111 to bit buffer 119 in such fashion that decoder 115 can make them available at the proper times to TV 117 and that bit buffer 119 never overflows or underflows. Bit buffer 119 underflows if not all of the bits in a picture 111 have arrived in bit buffer 119 by the time specified in the picture's time stamp for decoder 115 to begin decoding the picture 111.

Providing pictures 111 to VBR decoder 115 in the proper order and at the proper times is made more complicated by the fact that a number of channels 114 may share a single very high bandwidth data link. For example, a CATV provider may use a satellite link to provide a large number of TV programs from a central location to a number of CATV network head ends, from which they are transmitted via coaxial or fiber optic cable to individual subscribers or may even use the satellite link to provide the TV programs directly to the subscribers. When a number of channels share a medium such as a satellite link, the medium is said to be multiplexed among the channels.

FIG. 2 shows such a multiplexed medium. A number of channels 114(0) through 114(n) which are carrying packets containing bits from variable rate bit stream. 109(0 . . . n) are received in multiplexer 203, which processes the packets as required to multiplex them onto high bandwidth medium 207. The packets then go via medium 207 to demultiplexer 209, which separates the packets into the packet streams for the individual channels 114(0 . . . n). A simple way of sharing a high bandwidth medium among a number of channels that are carrying digital data is to repeatedly give each individual channel 114 access to the high bandwidth medium for a short period of time, termed herein a slot.

One way of doing this is shown at 210 in FIG. 2. The short period of time appears at 210 as a slot 213; during a slot 213, a fixed number of packets 113 belonging to a channel 114 may be output to medium 207. Each channel 114 in turn has a slot 213, and all of the slots taken together make up a time slice 211. When medium 207 is carrying channels like channel 114 that have varying bit rates and time constraints, slot 213 for each of the channels 114 must output enough packets to provide bits at the rate necessary to send the largest pictures 111 to channel 114 within channel 114's time, overflow, and underflow constraints. Of course, most of the time, a channel's slot 213 will be outputting fewer packets than the maximum to medium 207, and sometimes may not be carrying any packets at all. Since each slot 213 represents a fixed portion of medium 207's total bandwidth, any time a slot 213 is not full, a part of medium 207's bandwidth is being wasted.

In order to avoid wasting the bandwidth of medium 207, a technique is used which ensures that time slice 211 is generally almost full of packets. This technique is termed statistical multiplexing. It takes advantage of the fact that at a given moment of time, each of the channels in a set of channels will be carrying bits at a different bit rate, and the bandwidth of medium 207 need only be large enough at that moment of time to transmit what the channels are presently carrying, not large enough to transmit what all of the channels could carry if they were transmitting at the maximum rate. The output of the channels is analyzed statistically to determine what the actual maximum rate of output for the entire set of channels will be and the bandwidth of medium 207 is sized to satisfy that actual peak rate. Typically, the bandwidth that is determined in this fashion will be far less than is required for multiplexing in the manner shown at 210 in FIG. 2. As a result, more channels can be sent in a given amount of bandwidth. At the level of slots, what statistical multiplexing requires is a mechanism which in effect permits a channel 114 to have a slot in time slice 211 which varies in length to suit the actual needs of channel 114 during that time slice 211. Such a time slice 211 with varying-length slots 215 is shown at 214.

One method of statistically multiplexing bit streams is disclosed in Rao, U.S. Pat. No. 5,506,844, *Method for Configuring a Statistical Multiplexer to Dynamically Allocate Communication Channel Bandwidth*, issued Apr. 9, 1996. FIG. 3 is an overview of the method disclosed in the Rao application. System 301 includes a set of encoders 302(0 . . . n) which encode a set of bit streams 105(0 . . . n). During a given period of time, termed herein a window, each encoder 302(i) encodes at a constant bit rate; however, the bit rate may be changed at the beginning of the window. The output of an encoder 302(i) is thus a bit stream 108(i) having a piecewise-constant bit rate. The bit streams 108(0 . . . n) are input to multiplexer 303, which multiplexes them onto medium 207.

Multiplexer 303 maximizes the use of medium 207 by adjusting the bit rates of encoders 302(0 . . . n). As mentioned above, there is a relationship between bit rate and picture quality. Generally, the higher the bit rate, the better the picture quality. Consequently, in adjusting the bit rates of encoders 302(0 . . . n), multiplexer 303 must be aware of the current picture quality of each bit stream and must adjust the bit rates not only to maximize the use of medium 207, but also to maximize the picture quality of each of the bit streams 108(i).

As Mux 303 operates, it receives information from each encoder 107(i) that indicates the picture distortion rate for encoder 107(i)'s current encoding rate (DIF 311(i)) and also keeps track of the fullness of encoding buffer 307(i) in encoder 107(i), as shown by arrow EBF 309(i). Encoding buffer 307(i) holds bit stream 105(i) while it is being encoded, and encoder 107(i) must encode at a rate such that encoding, buffer 307(i) neither overflows nor underflows. Multiplexer 303 determines from the current distortion rates of the encoders 107 which encoders need to encode at a higher bit rate and which can encode at a lower bit rate and at the beginning of a window, it adjusts the rate of each encoder 107, as indicated by the arrows BRCTL 305(0 . . . *n*), to maximize the picture quality for all of the encoders 107 while maximizing the degree to which medium 207's bandwidth is used. When multiplexer 303 reduces or increases an encoder 107(*i*)'s bit rate, it also reduces or increases the size of EBUF 307(*i*) in the encoder.

While the statistical multiplexer of Rao does maximize the degree to which medium 207's bandwidth is used, it has a number of shortcomings. Perhaps the most important of these is that it adjusts the multiplexing by changing picture quality. The system thus cannot guarantee any user a given quality of picture.

Another shortcoming is that it requires encoders that encode digital images as piecewise-constant bit streams. Such bit streams have a lower degree of compression than variable-rate bit streams; further, the encoding rate and therefore the quality of the picture changes at the beginning of each window; with sequences of fast changing images, this will produce coding artifacts in the pictures.

Still another is that the multiplexing requires feedback from multiplexer 303 to encoders 302(0 . . . *n*). One consequence of this fact is that multiplexer 303 will not work with pre-stored sequences of pictures 111; another is that in order to use information like encoder buffer fullness 309 and distortion information 311 to allocate bandwidth in medium 207, multiplexer 303 must take into account the inner workings of encoder 107. A third is that there must be a high-speed connection between multiplexer 303 and each encoder 302 to exchange the control information. Finally, the bitrate switching of the encoders and the multiplexer is difficult to implement, particularly if it is necessary to support video inputs having different frame rates.

It is an object of the invention disclosed herein to overcome these shortcomings and thereby to provide an improved statistical multiplexer.

SUMMARY OF THE INVENTION

The invention is embodied in a multiplexer that overcomes the foregoing problems of the prior art by determining the rate at which each bit stream is to be output to the medium in accordance with rate information obtained by applying a model of a receiver for each of the bit streams to information contained in the bit stream itself. The rate for each bit stream is determined such that the receiver for the bit stream will neither underflow nor overflow and the multiplexer's use of the medium's bandwidth is maximized. Advantages of the multiplexer of the invention include the fact that all of the information needed to determine the rates is available within the multiplexer itself, the fact that the technique will work with any kind of bit stream for which it is possible to make a receiver model that is able to determine an output rate on the basis of information read from the bit stream, and the fact that adjustment of the output rates does not affect the contents of the bit stream.

In another aspect, the rate information for each bit stream is provided as a minimum allowable rate and a maximum allowable rate and the multiplexer allocates bandwidth to the bit streams by first giving each bit stream its minimum allowable rate and then allocating any remaining bandwidth to the bit streams up to the maximum rate for each bit stream. In the preferred embodiment, allocation of the remaining bandwith for a bit stream is done proportionally to the difference between the maximum and minimum rates for the bit stream.

In another aspect of the invention, the multiplexer further uses priority information about the bit streams in adjusting the rates of the bit streams when there is not enough bandwidth for all of the bit streams to receive the minimum amount. Each bit stream is either a priority one, priority two, or priority three bit stream, with priority one bit streams being required to meet the time constraints set in the bit stream, priority two bit streams being required only not to underflow, and priority three bit streams being permitted to underflow. Where bandwidth is necessary for priority one or priority two bit streams, it is taken from priority two and/or priority three bit streams.

Still another aspect of the invention is a multiplexer for MPEG-2 bit streams. The statistical multiplexer multiplexes a plurality of MPEG-2 bit streams and constant bit rate audio bit streams onto an output medium. Included in this aspect of the invention are a receiver model for MPEG-2 bit streams and algorithms for using the model to determine the output bit rate for a MPEG-2 bit stream.

These and other aspects and objects of the invention will become apparent to those skilled in the arts to which the invention pertains upon perusal of the following Detailed Description and Drawing, wherein:

BRIEF DESCRIPTION OF THE DRAWING

FIG. 4 is a block diagram of a statistical multiplexer which implements a preferred embodiment of the invention;

FIG. 6 is pseudo-code for the algorithm used to determine the bit rate of a channel in the preferred embodiment;

Figure 1:
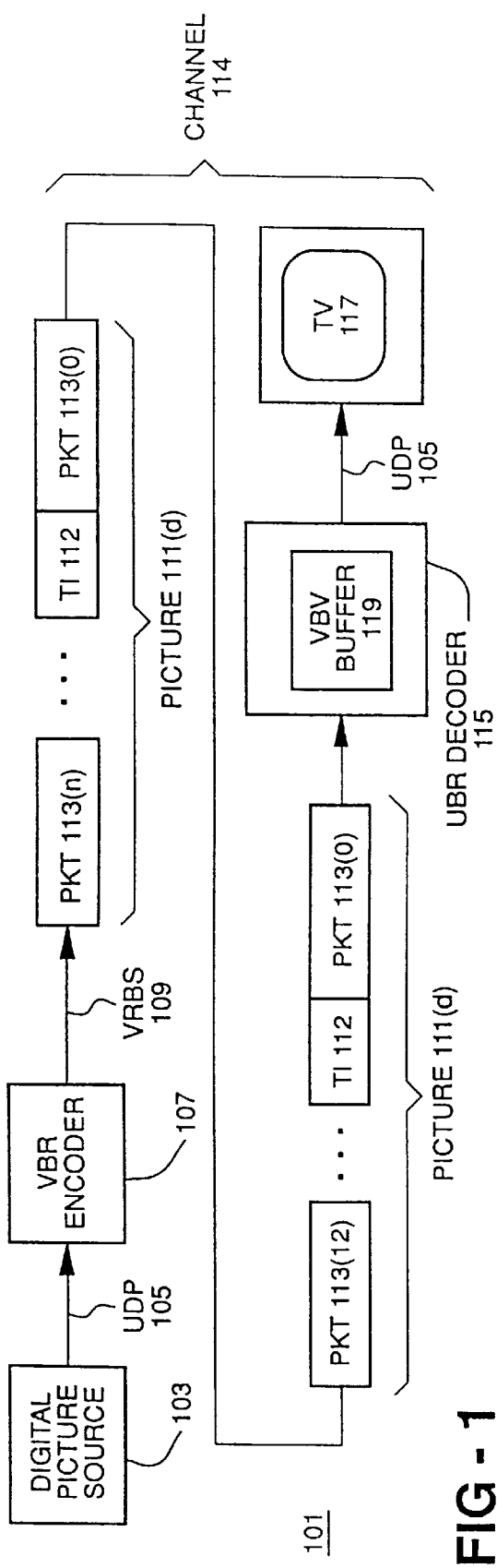
FIG. 1 is a diagram showing how digital television pictures are encoded, transmitted, and decoded.
Figure 3:
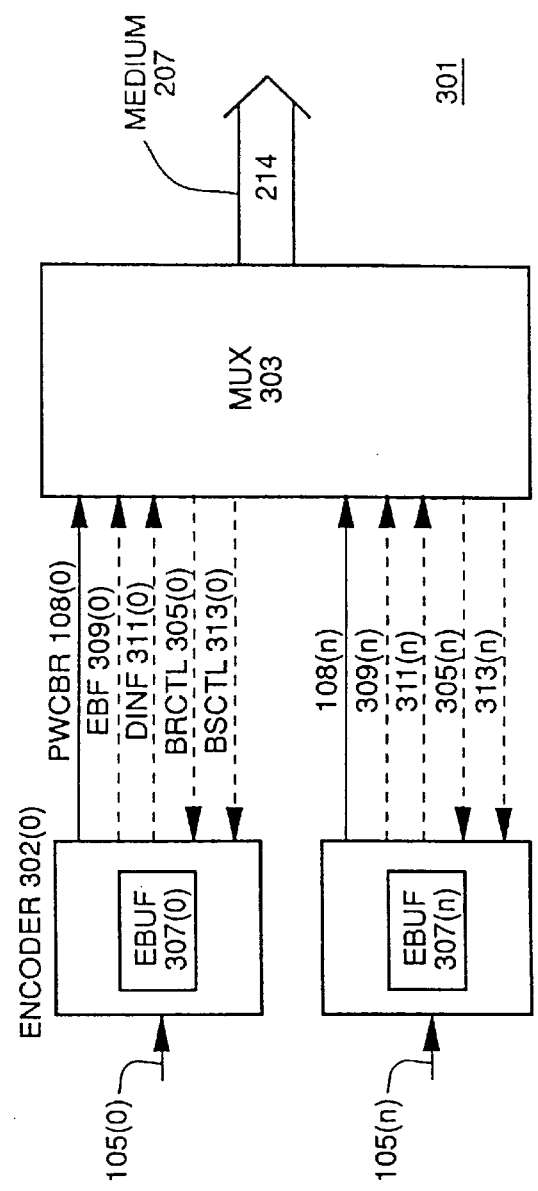
FIG. 3 is a block diagram of a prior-art statistical multiplexer.
Figure 2:
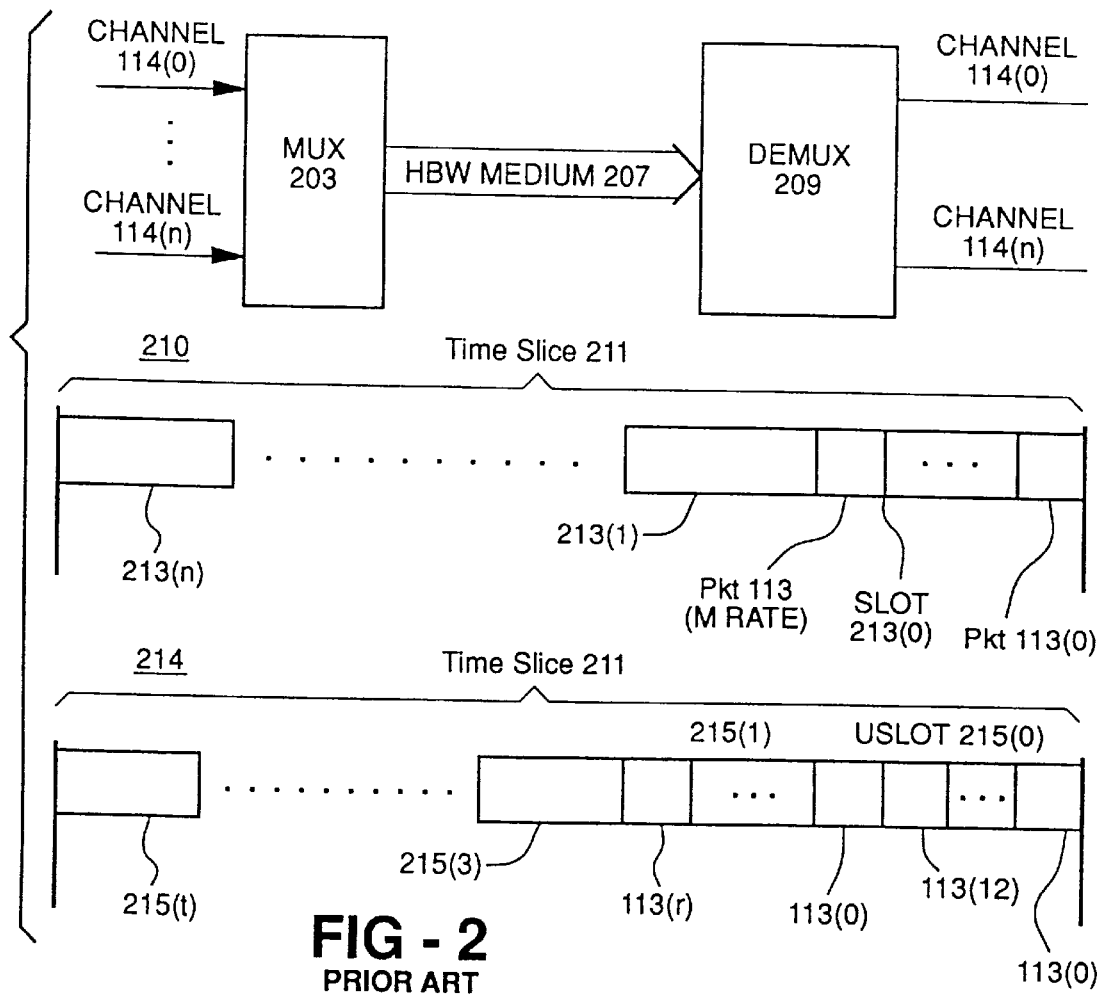
FIG. 2 is a diagram showing multiplexing of variable-rate bit streams onto a high band width medium.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description will first present an overview of the preferred embodiment, will then provide a description of the hardware in which the preferred embodiment is implemented, and will finally provide a detailed description of the algorithms used to allocate bandwidth in the preferred embodiment.

Figure 8:
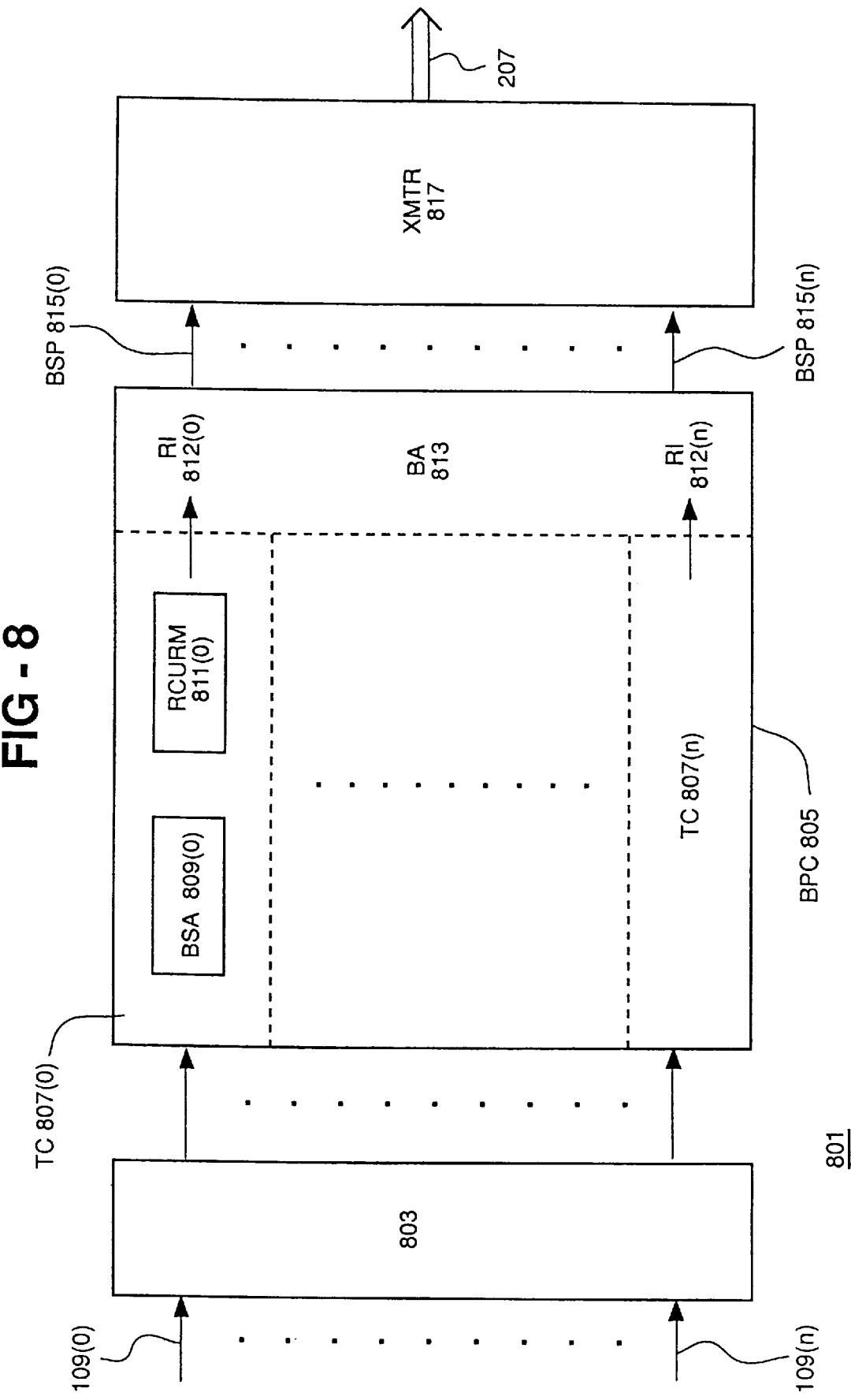
FIG. 8 is a conceptual block diagram of the statistical multiplexer.

Conceptual Overview: FIG. 8

FIG. 8 presents a conceptual overview of a statistical multiplexer 801 which incorporates the principles of the invention. A number n of variable-rate bit streams 109 are received in receiver 803, which provides them to bandwidth portion controller 805. Bandwidth portion controller 805 dynamically determines what portion of the bandwidth of medium 801 that each bit stream 109($i$) is to receive and provides a corresponding portion 815($i$) of the bit stream to transmitter 817, which outputs the portions 815(0 . . . n) it receives of each bit stream 109(0 . . . n) onto medium 207.

Bandwidth portion controller 805 has a number of subcomponents. There is a transmission controller 807($i$) for each bit stream 109($i$). Each transmission controller 807($i$) contains a bit stream analyzer 809($i$) and a receiver model 811($i$). Bit stream analyzer 809($i$) collects information from bit stream 109($i$) and applies receiver model 811($i$) to the collected information to determine what rate is required by the condition of the receiving device. In the case of a MPEG-2 bit stream, the receiving device is a decoder 115($i$), and for such a decoder, the required rate can be determined from the time stamps and the sizes of the pictures making up bit stream 109($i$). Transmission controller 807($i$) applies receiver model 811($i$) to this information to determine rate information 812($i$). Bandwidth allocator 813 receives rate information 812(0 . . . n) and uses this information to allocate the portion of the bandwidth of medium 207 that each bit stream 109($i$) is to receive. Having done this for each bit stream 109(0 . . . n), it provides a bit stream portion 815($i$) that corresponds to the allocated bandwidth to transmitter 817.

It is worth noting here that all of the information required by the above technique for allocating bandwidth can be obtained by applying the receiver models 811 to the information received from the bit streams 109 and that information need only be exchanged between bandwidth allocator 813 and transmission controllers 807. There is no need whatever to receive information from or provide information to the encoders 107. Put another way, all of the information needed to allocate the bandwidth is available within statistical multiplexer 801 itself.

It is also worth noting that the technique of using a model of a receiver to control the rate at which a bit stream is output to a receiver may be applied in other situations. For example, a receiver model could be used to control the rate at which a MPEG-2 encoder encoded data.

Overview of a Preferred Embodiment: FIG. 4

FIG. 4 provides an overview of a statistical multiplexer 401 for MPEG-2 bit streams which is implemented according to the principles of the invention. The main components of multiplexer 401 are packet collection controller 403, a transmission controller 407($i$) for each variable-rate bit stream 109($i$), a packet delivery controller 419, and a modulator 423, which receives the output of packet delivery controller 419 and outputs it in the proper form for transmission medium 207. Packet collection controller 403 collects packets from variable-rate bit streams 109(0 . . . n) and distributes the packets that carry a given bit stream 109($i$) to the bit stream's corresponding transmission controller 407($i$). In the preferred embodiment, the packets for all of the bit streams 109(0 . . . n) are output to bus 402. Each packet contains an indication of which bit stream it belongs to, and packet collection controller responds to the indication contained in a packet by routing it to the proper transmission controller 407($i$). It should be noted here that the packets in each bit stream 109($i$) arrive in transmission controller 407($i$) in the order in which they were sent by encoder 107($i$).

Transmission controller 407($i$) determines the rate at which packets from its corresponding bit stream 109($i$) is output to medium 207. The actual rate determination is made by transmission rate controller 413, which at a minimum, bases its determination on the following information:

for at least a current picture 111 in bit stream 109($i$), the timing information 112 and the size of the current picture.

a Video Buffer Verifier (VBV) model 415($i$), which is a model of a hypothetical bit buffer 119($i$).

VBV model 415($i$) uses the timing information and picture size information to determine a range of rates at which bit stream 109($i$) must be provided to the decoder's bit buffer 119($i$) if bit buffer 119($i$) is to neither overflow nor underflow. Transmission rate controller 413($i$) provides the rate information to packet delivery controller 419, which uses the information from all of the transmission controllers 407 to determine during each time slice how the bandwidth of transmission medium 207 should be allocated among the bit streams 109 during the next time slice. The more packets a bit stream 109($i$) needs to output during a time slice, the more bandwidth it receives for that time slice.

Continuing in more detail, transmission controller 407 obtains the timing and picture size information by means of bit stream analyzer 409, which reads bit stream 109($i$) as it enters transmission controller 407 and recovers the timing information 114 and the picture size 411 from bit stream 109($i$). Bit stream analyzer 409 can do so because the MPEG-2 standard requires that the beginning of each picture 111 be marked and that the timing information 114 occupy predetermined locations in each picture 111. As previously explained, timing information 114 for each picture 111 includes a clock value and a decoding time stamp. Transmission controller 407($i$) and later decoder 115($i$) use the clock value to synchronize themselves with encoder 107($i$). The timing information is found in the header of the PES packet that encapsulates the compressed video data. The information is contained in the PTS and DTS time stamp parameters of the PES header. The MPEG-2 standard requires that a time stamp be sent at least every 700 msec. If a compressed picture is not explicitly sent with a compressed picture, then the decoding time can be determined from parameters in the Sequence and Picture headers. For details, see Annex C of ISO/IEC 13818-1. Bit stream analyzer 409 determines the size of a picture simply by counting the bits (or packets) from the beginning of one picture to the beginning of the next picture.

The timing information and the picture size are used in VBV model 415($i$). VBV model 415($i$) requires the timing information and picture size information for each picture in bit stream 109($i$) from the time the picture enters multiplexer 401 until the time the picture is decoded in decoder 115($i$). DTS buffer 414 must be large enough to sold the timing information for all of the pictures required for the model. It should be noted here that VBV model 415($i$)'s behavior is defined solely by the semantics of the MPEG-2 standard, not by any concrete bit buffer 119($i$). Any bit buffer for a working MPEG-2 decoder must be able to provide the decoder with the complete next picture at the time indicated by the picture's timing information; that means that the bit buffer 119($i$) for any working MPEG-2 decoder must be at a minimum large enough for the largest possible MPEG-2 picture. Given this minimum buffer size, the timing information for the pictures, and the sizes of the individual pictures, VBV model 415($i$) can determine a rate of output for bit stream 109($i$) which will guarantee for bit buffers 119($i$) of any working MPEG-2 decoder that each picture arrives in the bit buffer 119(i) before the time it is to be decoded and that there will be no overflow of bit buffer 119(i).

Figure 5:
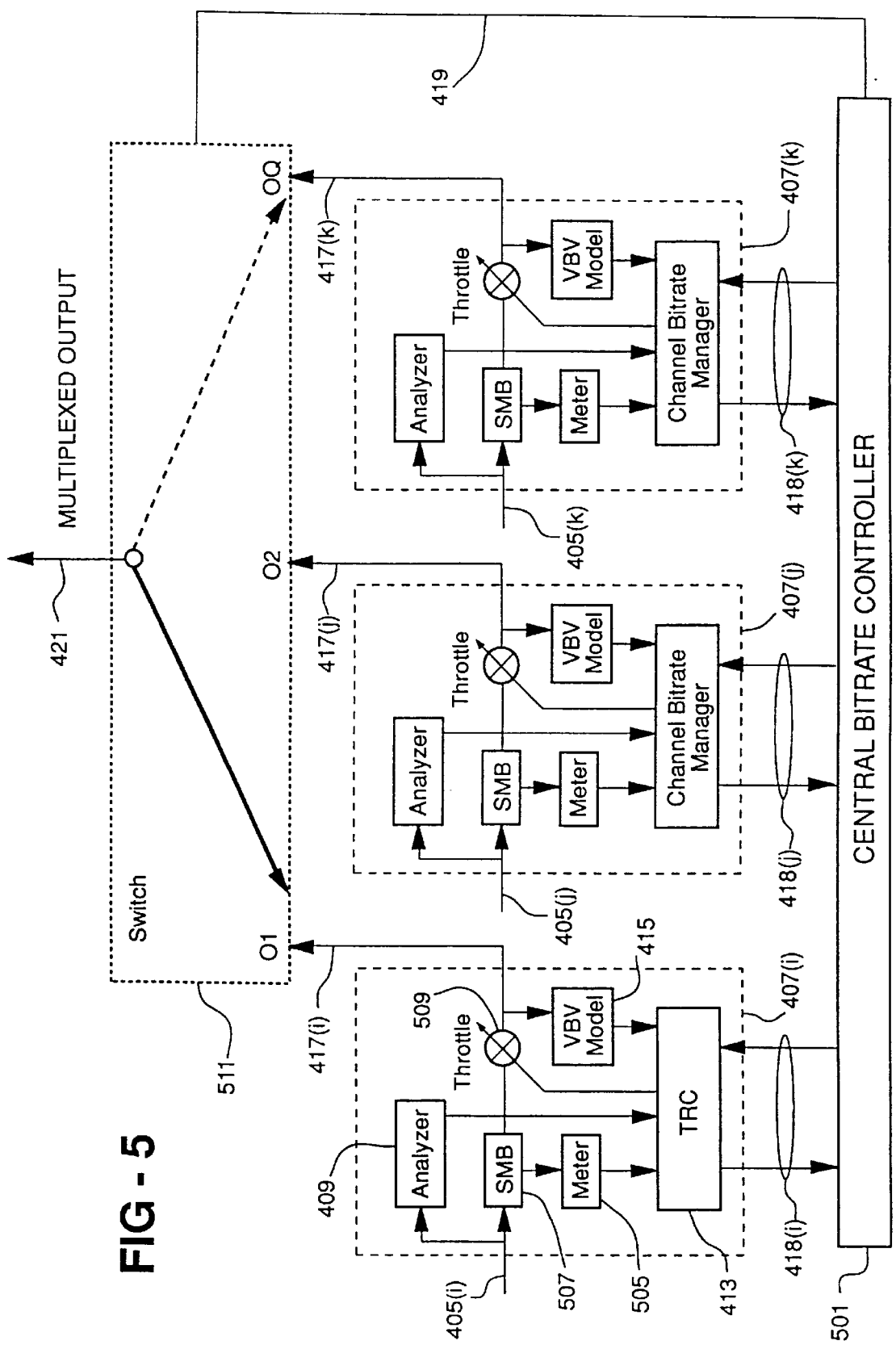
FIG. 5 is a more detailed block diagram of a part of the statistical multiplexer of FIG. 4.

Details of Transmission Controller 407 and Packet Delivery Controller 419: FIG. 5

FIG. 5 shows the details of a preferred embodiment of transmission controller 407 and packet delivery controller 419. The figure shows three of the n transmission controllers, namely transmission controllers 407(... k), and the two major components of packet delivery controller 419, namely central bit rate controller 501 and switch 511. Beginning with transmission controller 407(i), in addition to transmission rate controller 413, analyzer 409, and VBV model 415, transmission controller 409 includes statistical multiplexer buffer (SMB) 507, a meter 505 for buffer 507, and throttle 509.

SMB 507(i) is a first-in-first-out pipe buffer which holds the bits of bit stream 109(i) while they are in transmission control 407(i). In the preferred embodiment, SMB 507(i) receives pictures 111 in bursts that contain all or almost all of the bits in the picture, depends on the picture size and maximal bit rate specified by the encoder. Such bursts are termed herein picture pulses, and the time period represented by such a picture pulse is denoted as $T_p$, which is the inverse of video frame rate. For example, $T_p=1/29.97=33$ ms for NTSC video coding. As previously stated, packet delivery controller 419 provides packets in time slices 211. The length of time of one of these slices is denoted herein as $T_c$. In a preferred embodiment, $T_c$ is 10 ms.

SMB 507(i) must of course be large enough to be able to accept picture pulses of any size during the time it takes to read out the largest expected picture pulse. SMB 507(i) further must be emptied at a rate that ensures that it cannot overflow, since that would result in the loss of bits from bit stream 109(i). It also should not underflow, since that would result in the insertion of null packets in the bit stream, resulting in the waste of a portion of the multiplexed medium. Meter 505 monitors the fullness of SMB 507(i) and provides information concerning the degree of fullness to TRC 413(i). TRC 413(i) then uses this information to vary the range of bit rates that it provides to packet delivery controller 419 as required to keep SMB 507(i) from overflowing or underflowing. In other embodiments, the degree of fullness from meter 505 can also be fed back to encoder 107(i) and used there to increase or decrease the encoding rate. It should be noted here that feeding back the degree of fullness to encoder 107(i) does not create any dependencies between statistical multiplexer 401 and a given type of encoder 107. Throttle 509, finally, is set by TRC 413 on the basis of information 418(i) that it has received from packet delivery controller 419 to indicate the number of packets 113 that bit stream 109(i) is to provide to medium 207 in time slice 211.

In determining the range, TRC 413 sets the minimum rate for a given time slice 211 to the maximum of the rate required to keep SMB 507 from overflowing and the rate required to keep VBV model 415(i) from underflowing and the maximum rate for the time slice to the minimum of the rate required to keep SMB 507 from underflowing and the rate required to keep VBV model 415(i) from overflowing.

Continuing with packet delivery controller 419, packet delivery controller 419 allocates the packets 113 that can be output during the time slice 211 $T_c$ to bit streams 109(0...n) as required to simultaneously satisfy the ranges of rates and priorities provided by TRC 413 for each transmission controller 407(i) and maximize the number of packets 113 output during time slice 211. In the preferred embodiment, controller 419 has two components, central bit rate controller 501, which is a processor that analyzes the information received from each of the transmission rate controllers 413 in order to determine how many packets from each bit stream 109(i) are to be output in the next time slice 211, and switch 511, which takes the number of packets 113 permitted by throttle 509(i) for each bit stream 109(i) during the time slice 211. Switch 511 is implemented so as to deliver packets from each throttle 509(i) such that the packets are evenly distributed across time slice 211. Implementing switch 511 in this way reduces the burstiness of the stream of packets 109(i) to decoder 115(i) and thereby reduces the amount of transport packet buffer needed in decoder 115. Such implementations of switch 511 are well-known in the art.

An important advantage of multiplexer 401, or indeed of any statistical multiplexer built according to the principles of the invention is that the multiplexer can simultaneously multiplex both constant-rate and variable-rate bit streams onto medium 207. The reason for this is that as far as statistical multiplexer 401 is concerned, a constant-rate bit stream is simply a degenerate case: it is a varying-rate bit stream whose rate never varies. Thus, with a constant-rate bit stream, TRC 413(i) always returns the same rate information 417(i) to packet delivery controller 419.

Figure 9:
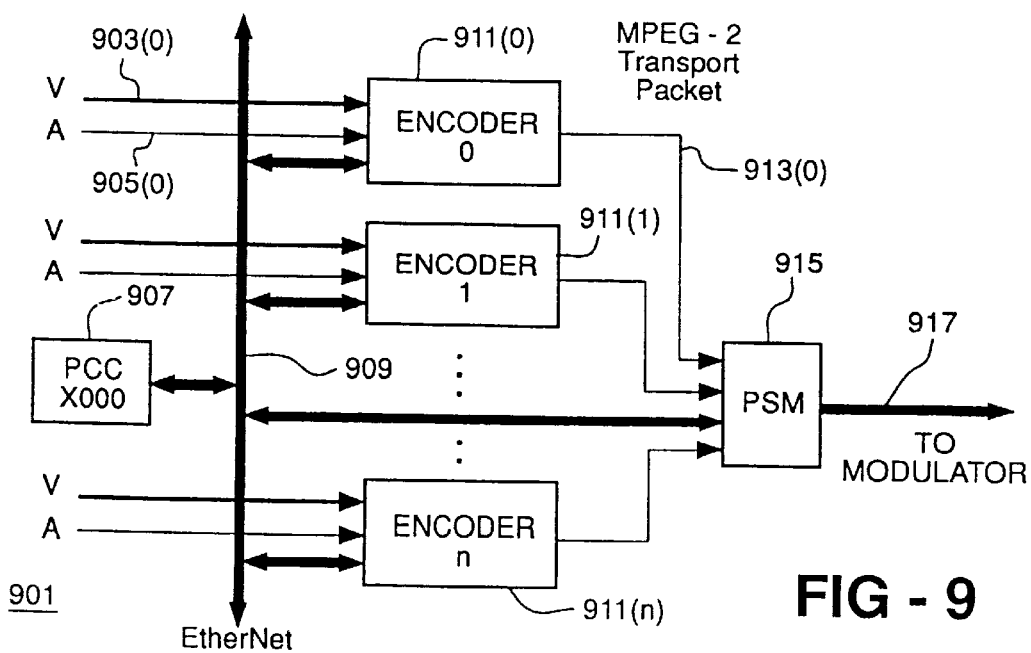
FIG. 9 is a high-level block diagram of an encoding system which includes an implementation of the statistical multiplexer.
Figure 10:
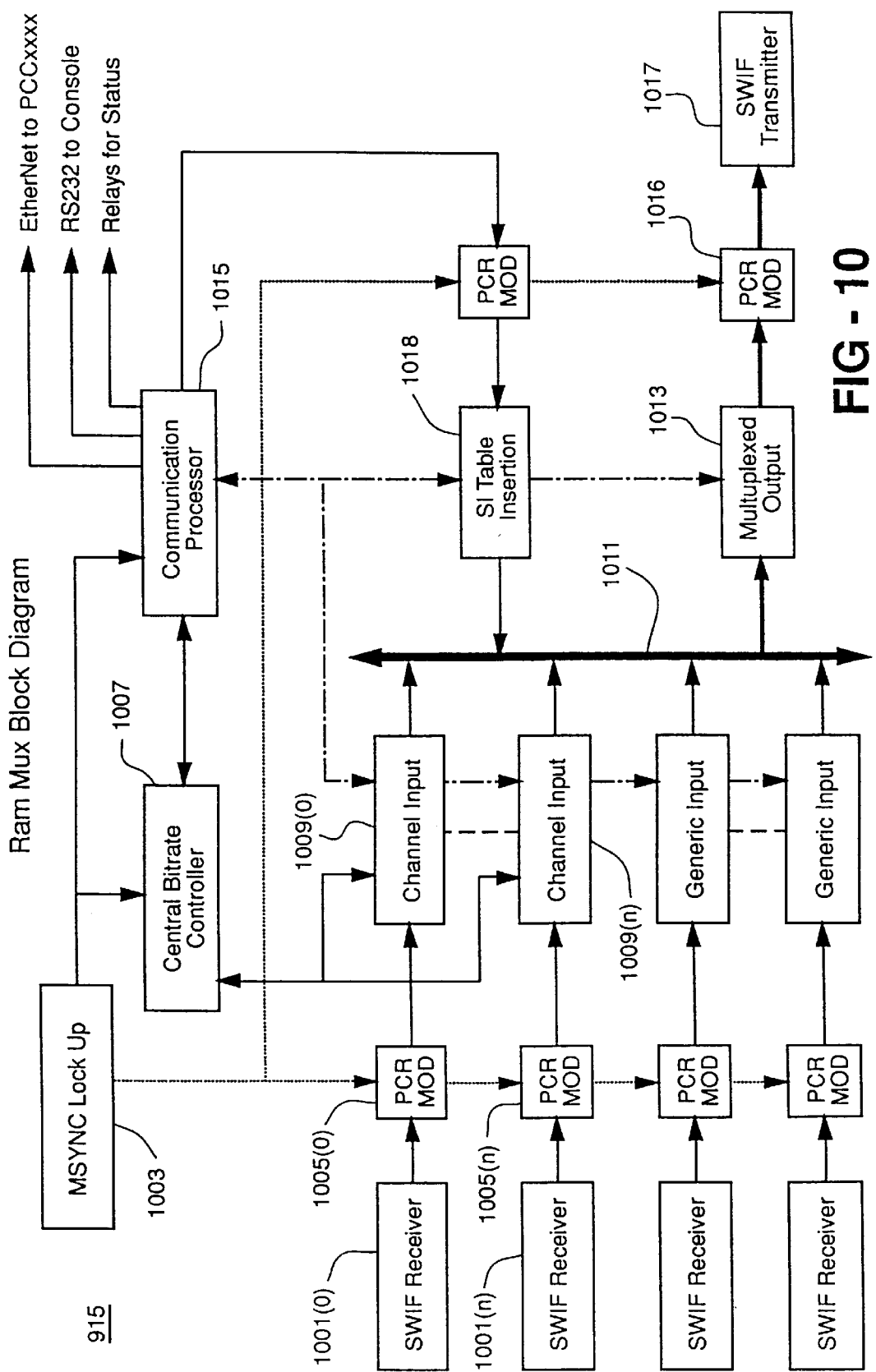
FIG. 10 is a more detailed view of the implementation of the statistical multiplexer.
Figure 11:
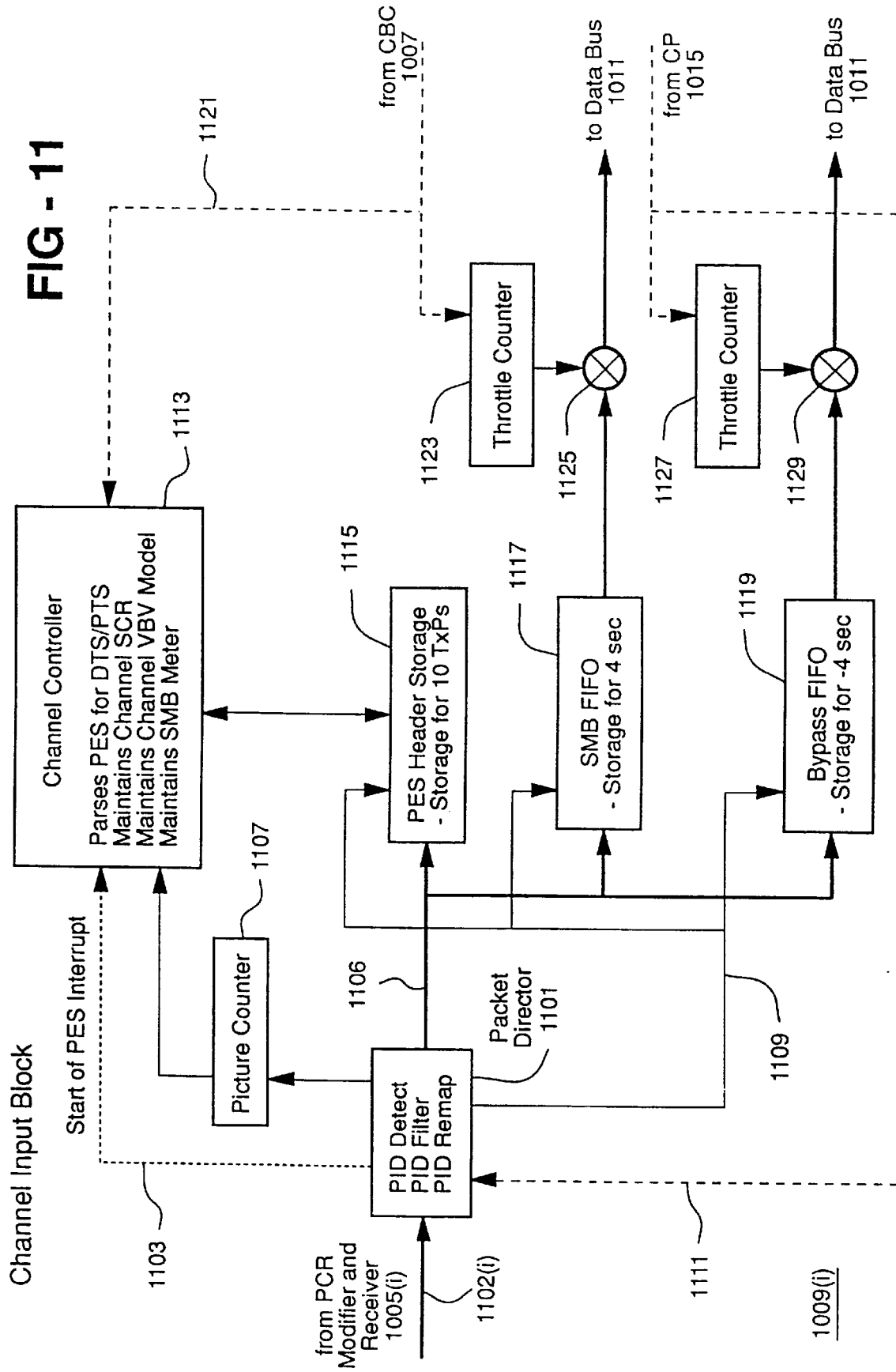
FIG. 11 is a detailed view of a channel input block in the statistical multiplexer of FIG. 10.

Hardware Implementation of a Preferred Embodiment: FIGS. 9–11

A presently-preferred embodiment of the invention is implemented as a modification of the PowerVu satellite up-link system manufactured by Scientific-Atlanta, Inc. (PowerVu is a trademark of Scientific-Atlanta). FIG. 9 is a high-level block diagram of the PowerVu up-link system as modified to implement the invention. System 901 includes a set of encoders 911(0...n). Each encoder 911(i) encodes a video input 903(i) and an audio input 905(i); the video input is encoded at a constant or variable bit rate and the audio input is encoded at a constant bit rate. Each encoder 911(i) has an output 913(i) which carries the encoded video and audio. In the PowerVu system as modified, the outputs 913(0...n) go to statistical multiplexer 915, which outputs a constant bit-rate stream 917 to a modulator for transmission to a communications satellite. At a high level, operation of all of the components of system 901 is supervised and controlled by control processor 907, which communicates with the other components by means of Ethernet protocol 909 (Ethernet is a registered trademark of Xerox Corporation). In the presently-preferred embodiment, statistical multiplexer 915 is implemented as a separate chassis which need only be coupled to the rest of the PowerVu system by encoded data inputs 913(0...n), Ethernet protocol 909, and output 917.

FIG. 10 shows the preferred embodiment of statistical multiplexer 915 in more detail. Multiplexer 915 receives its inputs of encoded video and audio from optical fibers. Each SWIF receiver 1001(i) receives input from a single optical fiber and there are receivers 1001(0...n) corresponding to encoders 911(0...n). Each receiver converts the information from photons to digital electronic form and outputs it via PCR MOD 1005(i) to channel input block 1009(i). PCR MOD 1005(i) corrects the clock information in the encoded video and audio to compensate for any delays in the encoding process. The synchronization information needed to do this is provided by MSYNC lock up 1003.

Channel Input 1009(i) is an implementation of transmission controller 407(i). Channel input 1009(i) employs a software implementation of VBV model 415 to dynamically determine a current rate at which the input from receiver 1001(i) must be output to multiplexed output stream 917 and provides that rate information to central bit rate controller 1007, which in turn actually allocates a specific rate to channel input block 1009(i). Channel input block 1009(i) then outputs bits in its bit stream to bus 1011 at that rate. The combined outputs of blocks 1009(0 . . . n) then go via multiplexed output 1013, PCR MOD 1016, and SWIF transmitter 1017 to output 917. PCR MOD 1016 modifies the clock information in the encoded video again to deal with the time spent in channel input block 1009(i) and outputs the bit stream to SWIF transmitter 1017, which converts the bit stream to a photonic representation and outputs it to an optical fiber. Communication processor 1015 provides high level control to central bitrate controller 1007 and also serves as the interface to PCC 907, a control console, and a system which broadcasts status information. Communications processor 1015 also receives MPEG-2 service information tables from PCC 907 and provides them to service information table insertion 1018, which inserts them into the bit streams.

A presently-preferred embodiment of a single channel input block 1009(i) is shown in more detail in FIG. 11. The main components are packet director 1101, which detects audio packets, video packets, and headers and routes them to different components of input block 1009(i), storage 1115 for the headers, storage 1117 for a FIFO (queue) to hold video packets from the time they are received in input block 1009(i) until they are output to data bus 1011, and a bypass FIFO 1119 which holds the constant bit rate audio packets while they are in input block 1009(i). Output from FIFO 1117 is controlled by throttle 1032 under control of throttle counter 1123, which specifies the number of packets to be output from FIFO 1117 during a given time slot. Output from FIFO 1127 is controlled by throttle 1129, which is controlled by throttle counter 1123. Throttle counter 1123 is set by channel controller 1113 in response to the rate selected by central bit rate controller 1007. Throttle counter 1127, which is for a constant-rate bit stream and does not depend on VBV model 415(i), is set directly by central bit rate controller 1007.

Operation of input block 1009(i) is as would be expected. Serial bit stream 1001(i) from SWIF receiver 1001(i) is modified by PCR 1005(i) and is output to packet director 1101, which detects packets, determines their types, and outputs them to the various components of channel input block 1009(i). Packet director 1101 further provides a start of picture interrupt 1103 to channel controller 1113 to indicate that a new picture is being received in SMB FIFO 1117. Channel controller 1113 responds to interrupt 1103 by using picture size information obtained from picture counter 1107, header information stored in header storage 1115, and information about the amount of space left in SMB FIFO 1117 in the VBV model 415(i) to obtain maximum and minimum rates at which data must be output from SMB FIFO 1117 to avoid overflow or underflow in SMB FIFO 1117 and overflow or underflow in VBV model 415(i). Channel controller 1113 outputs these rates via 1121 to central bitrate controller 1007, which selects a rate for the next time slice on the basis of the information from channel controller 1113, the current output requirements of all of the other channel controllers 113, and the total capacity of the output stream. Central bitrate controller 1007 returns the selected rate to channel controller 1113, which sets throttle counter 1132 accordingly. Throttle counter 1132 then determines how many bits are actually output by throttle 1125 during the next time slice.

As shown in FIG. 11, packet director 1101 is implemented by means of gate arrays and a dual port RAM memory. Counters 1107 and 1123 are also implemented using gate arrays and channel controller 1113 is a digital signal processor. Central bitrate controller 1007 is implemented using a microprocessor with a support IC.

Figure 7:
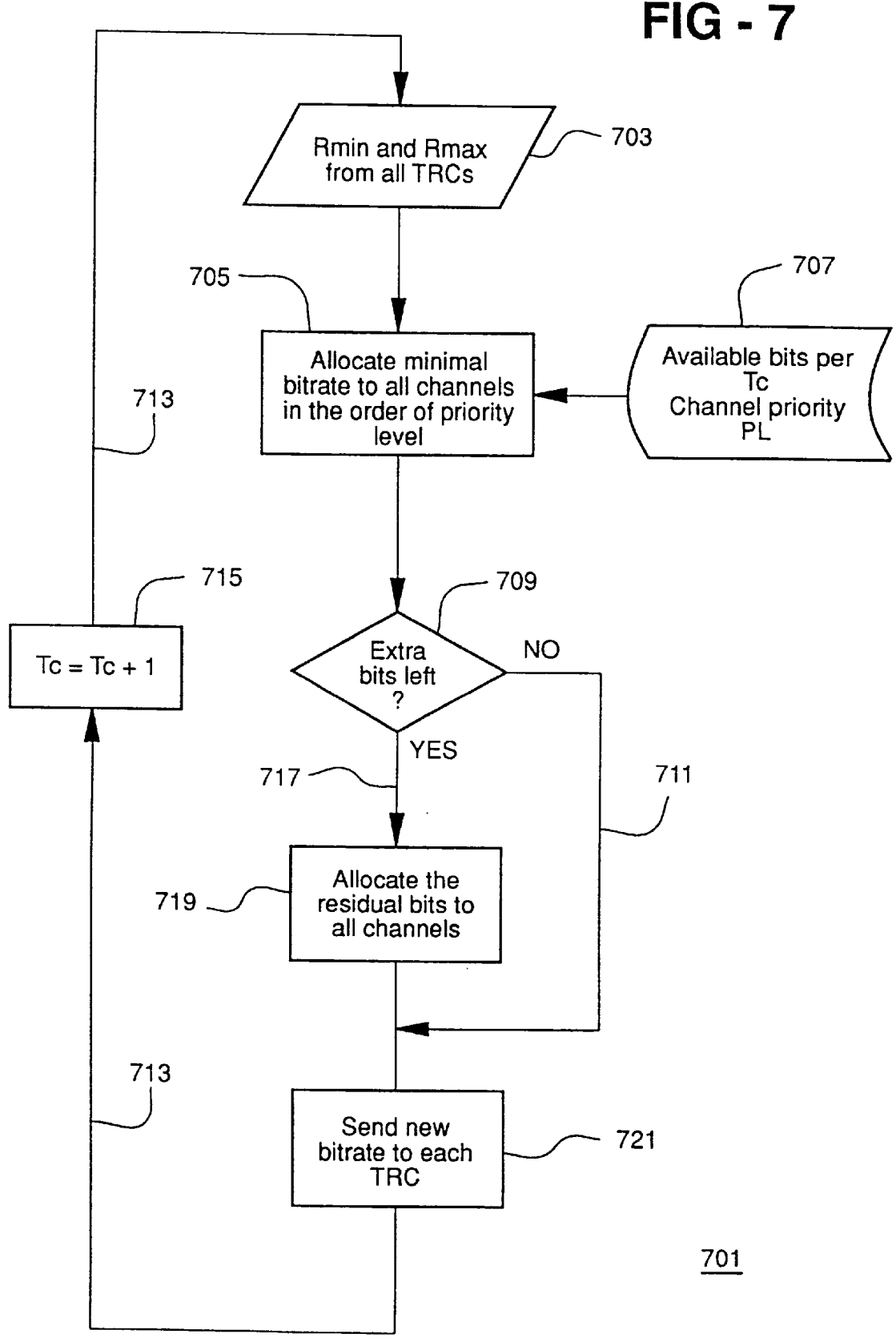
FIG. 7 is a flow chart for the algorithm used to allocate the total bit rate of medium 207 among the channels.
Figure 12:
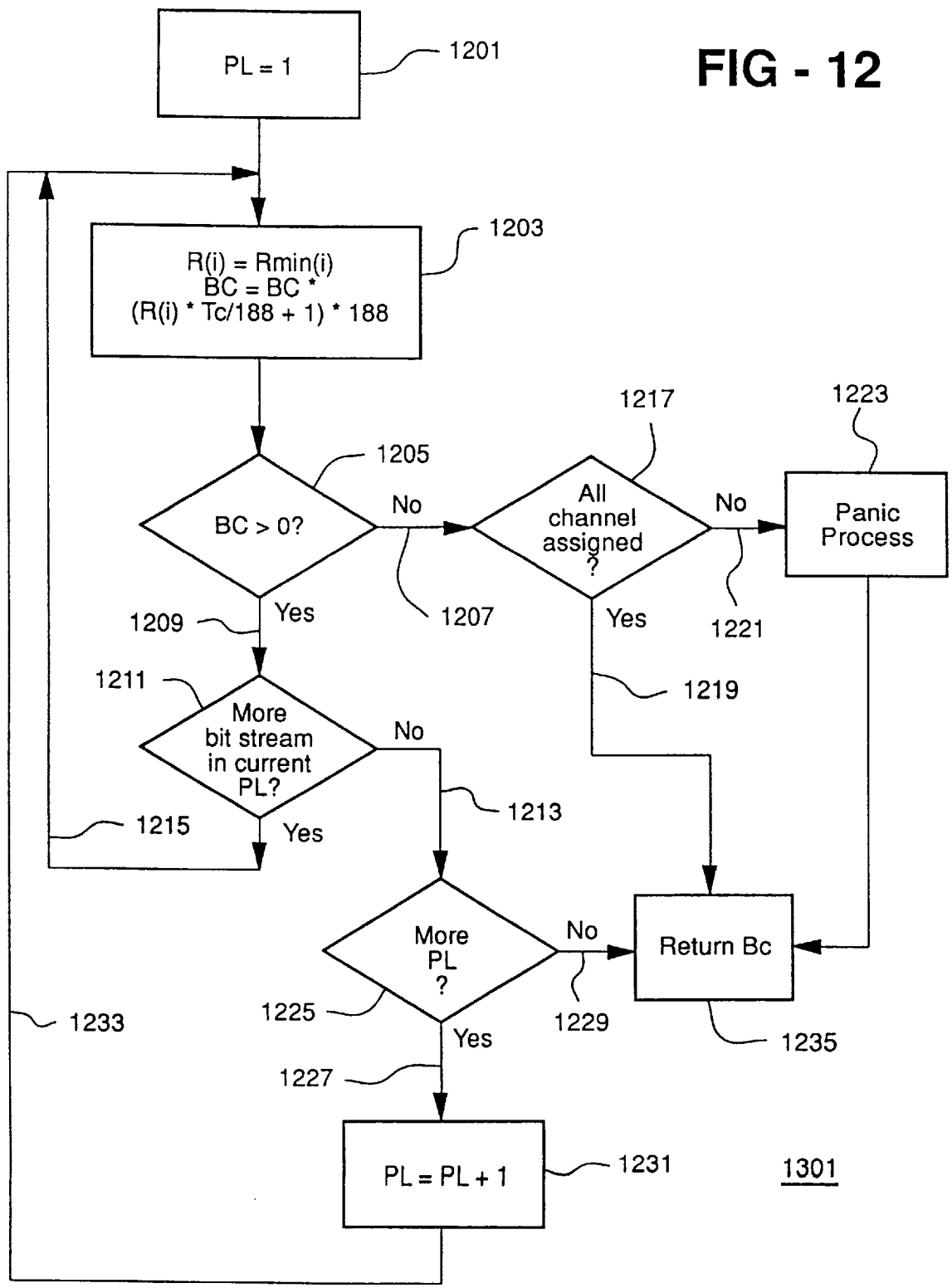
FIG. 12 is a flowchart of the minimal bitrate algorithm.

Detailed Description of Algorithms Used to Compute the Output Rate for a Bit Stream 109(i) From Statistical Multiplexer 401: FIGS. 6, 7, and 12

As indicated above, the maximum rate $R_{max}$ at which a transmission controller 407(i) may output packets 113 to medium 207 is determined by the need to keep SMB buffer 507(i) from underflowing and bit buffer 119(i) from overflowing. The minimum rate $R_{min}$ is determined by the need to keep SMB buffer 507(i) from overflowing and bit buffer 119(i) from underflowing. Bit buffer 119(i) will not underflow if all packets belonging to the picture currently being sent arrive in bit buffer 119(i) before the time indicated in the DTS stamp for the picture.

There are thus two maximum rates and two minimum rates that need to be taken into account in determining $R_{max}$ and $R_{min}$:

$R_{max1}$ is the maximum rate at which bit buffer 119(i) in any MPEG-2 decoder that conforms to the standard will not overflow;

$R_{max2}$ is the maximum rate at which SMB 507(i) will not underflow;

$R_{min1}$ is the minimum rate at which bit buffer 119(i) will not underflow; and $R_{min2}$ is the minimum rate at which SMB 507(i) will not overflow.

$R_{max}$ and $R_{min}$ are determined from the above four maxima and minima as follows:

$R_{max}$ is the minimum of $R_{max1}$ and $R_{max2}$.

$R_{min}$ is the maximum of $R_{min1}$ and $R_{min2}$.

What is needed to compute $R_{min1}$ and $R_{max1}$ is a VBV model 415(i) that models the fullness and emptiness of bit buffer 119(i); what is needed to compute $R_{min2}$ and $R_{max2}$ is a measure of the fullness and emptiness of SMB buffer 507(i). The model for the fullness of bit buffer 119(i) is termed herein VBV fullness and the model for the emptiness of bit buffer 119(i) is termed herein VBV emptiness. The algorithms for measuring VBV emptiness and SMB buffer emptiness and fullness are simple and will be dealt with first; the algorithm for measuring VBV fullness is substantially more complex.

In the case of SMB 507(i), the measure of SMB emptiness, $E_{SMB}$, is the amount of free space remaining in SMB 507(i). For a given time slice $T_c$ 211(m), it is defined as follows:

$$E_{SMB} = \text{SMB\_SIZE} - F_{SMB}(m);$$

where $F_{SMB}$ is the actual SMB fullness measured by the Meter 505. Since there is a maximum size for MPEG-2 pictures, termed herein VBV_SIZE, the way to prevent SMB 507(i) from overflowing is to guarantee that there is always an empt) space in SMB 507(i) that is larger than or equal to VBV_SIZE. If the free space becomes less than that, the minimum rate with regard to SMB 507(i), $R_{min2}$, must be increased in the next time slice $T_c$ (m+1) according to the algorithm below:

if $(E_{SMB} < \text{VBV\_SIZE}) \{R_{min2}(m+1) = (\text{VBV\_SIZE} - E_{MSB}(m))/T_C;\}$ $R_{max2}$ is computed as follows:

$$R_{max2}(m+1) = F_{SMB}(m)/T_c$$

Continuing with the determination of $R_{min1}$ for the next $T_c$ from VBV model 415(i), the rate can be found from the information in VBV model 415(*i*) concerning the pictures 111 in SMB 507(*i*). The rule is simply this: the minimum bit rate must be such that the picture currently being output is completely output from SMB 507(*i*) before the time indicated by its DTS time stamp. One implementation is $$R_{min1}(m+1) = \text{pic\_residual\_bits}(q)/(\text{DTS\_V}_{max}-t);$$

Here, pic_residual_bits is the number of bits of the picture 111 remaining in SMB 507(*i*), q is the index of the picture currently being transmitted from SMB 507(*i*) and q+1, q+2, . . . are the indexes of the following pictures, $\text{DTS\_V}_{max}$ is the time stamp with the most recent time in VBV model 415(*i*), and t is the actual time determined by the synchronization time value in the bit stream.

The above algorithm guarantees that all bits belonging to the picture 111 which is currently being delivered to bit buffer 119(*i*) will have been delivered before the decoding time $\text{DTS\_V}_{max}$ arrives. This algorithm may leave only one coded picture in the decoder's bit buffer for decoding. While this picture could be decoded correctly, a high bit rate will be necessary to deliver the next picture on time such that all the bits belong to the next picture, p+1, will be available for decoding at the next decoding time instance. This requirement will result in a high bitrate requirement for next Tc period and will introduce congestion in the delivery media at the next Tc period. A better algorithm is one that guarantees at least two pictures (or more, as long as VBV model 415(*i*) does not indicate an overflow) in bit buffer 119(*i*), such as the following:

$$R_{min1}(m+1) = \text{pic\_residual\_bits}(q)/(\text{DTS}(q-1)-t)$$

In this scheme, the minimal bitrate calculation is slightly changed by using the second largest value of DTS in bit buffer (119(*i*), DTS (q−1). That is the time stamp for the picture 111 preceding the last picture 111 to be sent to bit buffer 119(*i*). This scheme guarantees that the picture p has already be delivered to decoder 115(*i*) at t=DTS (q−1). Of course, it is even better to set up the minimal bit rate so that the number of coded pictures in bit buffer 119(*i*) is usually more than 2.

Determining VBV Fullness: FIG. 6

When there is no need to prevent overflow of SMB 507(*i*), the maximum bitrate of bit stream 109(*i*) is determined from the VBV fullness indicated by VBV model 415(*i*).

The greater the VBV fullness indicated by the model, the less the maximum bitrate. At the beginning of the operation of model 415(*i*), SMB 507(*i*) is empty and VBV fullness indicates that model 415(*i*) is empty. As soon as bits appear in SMB 507(*i*), central bitrate controller 501 begins outputting them at a predetermined initial rate, for instance, the average rate for such variable-rate bit streams. As bits are received in SMB 507(*i*) and output to medium 207, the picture information in VBV model 415(*i*) is updated each time slice. The newly updated information is used to compute VBV fullness for the next time slice and the VBV fullness is used in turn to determine the maximum bit rate $R_{max1}$ at which bits will be output on bit stream 109(*i*) for the next time period. The computation is the following:

$$R_{max1}(m+1) = (\text{VBV\_SIZE} - F_{vbv}(m))/T_c$$

where $F_{vbv}$ is the VBV fullness measure provided by VBV model 415(*i*) and m and m+1 are the current and next time slices $T_c$ 211.

In the preferred embodiment, the computation of $F_{vbv}(m)$ is governed by the following considerations:

The calculation requires a computation of the number of pictures 111 are currently contained in VBV model 415(*i*).

The calculation requires a knowledge of how many bits of the picture 111 which is currently being transmitted from SMB 507(*i*) presently remain in SMB 507(*i*).

The data items used to compute $F_{vbv}(m)$ in the preferred embodiment include the following:

a. VBV_SIZE, that is, the maximum size of a MPEG-2 picture.

b. The absolute maximum bit rate $R_{max}$ which packet delivery controller 419 can provide to bit stream 109(*i*).

c. The current time, t, recovered from the clock time information of bit stream 109(*i*).

d. Data items for each picture presently in SMB 507(*i*): packet_cnt, the number of packets 113 in the picture, DTS, the time stamp for the picture, q, the index for DTS and packet_cnt for the picture currently leaving SMB 507(*i*), and r, the index for those values for the oldest picture for which there is still information in model 415(*i*).

e. Status data items in VBV model 415(*i*) that are updated every $T_c$ 211: pic_cnt_VBV, the number of pictures 111 which are presently represented in VBV model 415(*i*); pic_residual_bit(q), the number of bits of picture 111q that is currently being transmitted to decoder 115(*i*) that remain in SMB 507(*i*); $\text{DTS\_V}_{max}$, the time stamp with the most recent time stamp value that is presently in VBV model 415(*i*); and $F_{vbv}$ itself.

As soon as SMB 507(*i*) begins receiving bit stream 109(*i*), packet delivery controller 419 sets throttle 509(*i*) to the initial rate provided by central bit rate controller 509. As packets are read from SMB 507(*i*) at that rate, transmission rate controller 413(*i*) updates $\text{DTS\_V}_{max}$, pic_cnt_VBV, $F_{vbv}$, and pic_residual_bits (q) as required by the transmission of pictures from SMB 507(*i*) to decoder 115(*i*) and by the addition of bits to SMB 507(*i*). The algorithm 601 used to do this in a preferred embodiment is shown in FIG. 6. Section 603 of algorithm 601 shows how the parameters are initialized at the time the first picture arrives in SMB 507(*i*). Execution of loop 604 begins when the first bits of the picture arrive in SMB 507(*i*). As shown at 605, the loop is executed once every $T_c$ 211. At the beginning of each execution of loop 604, pic_residual_bits is decremented by the number of bits that were sent at the rate R(m) previously determined for the current $T_c$ 211 by central bitrate controller 501.

At 607, $F_{vbv}$ is computed. There are two cases. In the first case, shown at 609, the time stamp DTS for the current picture r in VBV model 415(*i*) indicates a time that is after the current time t for bit stream 109(*i*), so decoding of the picture r cannot yet have begun. Consequently, the bits that were sent during the last $T_c$ 211 are simply added to the bits that are already in VBV model 415(*i*) and $F_{vbv}$ is incremented bad that amount. If the comparison of t and DTS (r) indicates that decoder 115(*i*) has already begun decoding the picture r, the second case, shown at 611, is executed. pic_cnt_VBV is decremented to indicate that one less picture is now represented in VBV model 415(*i*) and $F_{vbv}$ is adjusted by the difference between the number of bits sent to decoder 115(*i*) in the last $T_c$ 211 and the total number of bits in the picture that is no longer represented in VBV model 415(*i*). After picture r is removed from VBV model, 415(*i*), the index r is incremented by 1.

Block of code 613 deals with the updating that has to be done when a picture q has been completely read from SMB 507(*i*). When that is the case, pic_residual_bits will have a value that is less than or equal to 0. The first updating that has to be done is shown at 615. The time stamp DTS for the picture 111 that was just sent is now the maximum DTS in Bit buffer 119(i), so DTS_$V_{max}$ is updated with DTS (q). A picture q has also been added to the pictures represented in VBV model 415(i), so pic_cnt_VBV is incremented accordingly. The second updating is at 617. The new current picture is the next picture in SMB 507(i), so q is updated accordingly. Similarly, pic_residual_bits is set to the number of bits in the new current picture.

Allocating the Total Capacity of Medium 207 Among the Channels: FIGS. 7 and 12

FIG. 7 shows a flowchart 701 of the CBC control algorithm that is used to assign the new bitrate for each VBR encoder for the next Tc period. The control algorithm is a loop 713 that executes each $T_c$. At the start of the loop, Rmin and Rmax from each TRC(i) are collected. The total available bits per Tc parameter, Bc, has already been calculated. Bc will be only updated when there is a change of channel bandwidth, Rc, which only happens rarely. Bc is calculated as $$Bc=Rc*Tc$$

where Tc is in units of seconds.

Bc is divided among the bit stream 109 in accordance with the ranges of rates specified by the TRCs (0 . . . n) and in accordance with a set of priorities which indicate which bit streams 109 are more important. The priorities are provided by the operator of processor 907 and are set for each bit stream when the multiplexer is initialized for the bit stream. In the preferred embodiment, there are three levels of priority, according to the extent to which timely delivery of the pictures in the bit stream is required:

PL=1: Every picture in the bit stream will be delivered, and each of them will be delivered on time.

PL=2: Some picture will always be delivered on time. For example, a picture may be repeated to keep bit buffer 115(i) from underflowing.

PL=3: No time guarantees. The bit stream could even be interrupted to give the channel to another bit stream.

PL 1 and 2 are used for real-time video programs. PL 3 is used for preemptible data, that is, data which has no real-time requirements. Examples of such data are non-real time video programs or non-time-dependent data such as E-mail. PL 3 permits full use of the available bandwidth in situations where the sum of the video data is less than the total vailable bandwidth. The total bandwidth available that $T_c$ and the priority for each bit stream 109(i) is provided by input block 707. The total bandwidth, the priorities, and the maximums and minimums for the channels are employed in block 705 to allocate a minimal bit rate to each bit stream 109(i). Details on the algorithm used to do this will be given below.

Once the minimal bit rates for all bit stream 109(0 . . . n) have been allocated, the algorithm subtracts the allocated bit rates from the total bandwidth to determine whether any bandwidth remains (709). If none is left, the allocation is finished and as shown at 711. 721, and 715, the bandwidth allocated to each TRC 413(i) is assigned to it (721) and loop 713 is repeated for the next $T_c$. If there are bits left (branch 717), the residual bits are assigned to the bit streams 109(i) that can take more bits (719). The algorithm for doing this is also explained in more detail below. Once the residual bits have been assigned, blocks 701, 715, and loop 213 are executed as described above. There remains, of course, the possibility that there is not enough total bandwidth to perform the allocation of block 705. This worst-case scenario is called Panic mode and will be further discussed later.

Minimal Bitrate Allocation Algorithm, FIG. 12

FIG. 12 shows a flowchart 1201 for this algorithm. The algorithm allocates a minimal bitrate to each TRC 413(i) and returns the number of bits still available to be allocated. The allocation is ordered by priorities, beginning with PL=1, as shown in block 1201. The remainder of the flowchart consists of an inner loop 1215, which is executed for each TRC 413(i) belonging to a given priority and an outer loop 1233 which is executed for each priority. The algorithm terminates when any of three conditions occurs:

there is no more bandwidth to allocate;

rates have been allocated to all bit streams 109(0 . . . n);

allocations have been made for all of the priorities.

Continuing in more detail with inner loop 1215, in block 1203, the TRC 413(i) to which bandwidth is currently being allocated receives the amount determined by $R_{min}(i)$ for that TRC 413(i). The bandwidth is rounded to complete 188-bit packets. In decision block 1205, it is determined whether there is any bandwidth left. If not, branch 207 is taken, terminating loop 1215; if there is, loop 1215 continues to decision block 1211, where it is determined whether there are more bit streams 109(i) having the current priority. If there are, loop 1215 is repeated; otherwise, as indicated by branch 1213, the program enters a new iteration of outer loop 1213. In that loop, decision block 1215 first checks whether there is another priority level to be processed; if there is (branch 227), PL is incremented and a new set of iterations of inner loop 1215 for that priority begins. If there is no additional priority level, loop 1233 terminates, as seen at branch 1229.

Looking at the termination conditions in more detail, if there is no more bandwidth to be allocated, branch 1207 is taken. In decision block 1217, it is determined whether there are any bit streams 109(i) for which a minimal bandwidth must still be allocated. If there are none, branch 1219 is taken and the remaining bandwidth is returned at 1235. If there are still bit streams 109(i), the program takes branch 1221 and enters the panic process 1223, which deals with the problem as required by the priorities of bit streams 109(0 . . . n) and then returns the remaining bandwidth at 1235. Similarly, branch 1229, taken when all priority levels have been processed, returns the remaining bandwidth at 1235.

Continuing with panic process 1223, if a bit stream 109(i) cannot receive the minimum rate it requires, one of two things may occur, depending on the bit stream:

SMB 507(i) may overflow, causing loss of data.

bit buffer 119(i) in decoder 115(i) may underflow, causing interruption of the display of pictures.

In the first case, either the input to SMB 507(i) must be decreased or the output from bit SMB 507(i) must be increased. Generally, the second solution can be employed in the short term and the first in the longer term. Beginning with the second solution, the extra bandwidth must be taken from priority 2 and 3 bit streams, beginning with bit streams 109(i) with priority 3. These bit streams have no time constraints and can be denied any bandwidth at all for as long as is necessary. Bandwidth can also be taken from priority 2 bit streams 109(i) that have space in their SMBs 507(i) by having them output a repeat of a picture until the panic condition is over or until their SMB 507(i) threatens to overflow. Of course, what the repeat produces at the receiver is a still picture. Because the repeat picture is totally redundant with regard to the picture it is repeating, it always has fewer bits than that picture.

Given that the reason for the substitution is to free up bandwidth, it is desirable to make the repeat picture as small as possible. That is achieved by sending a repeat of a coded picture that is not used to predict other pictures. B pictures fulfill this criterion, as do P pictures that immediately precede an I picture in sequences that do not contain B pictures. The substitution technique requires that transmission controller 113 for a PL 2 bit stream respond to an indication of a panic from central bitrate controller 1007 by reading header information to determine the type and size of the picture being output and when it finds the proper kind of picture, following it with repeat pictures until the panic is over.

Where the problem is underflow of bit buffer 119, if the bit stream is a priority 1 bit stream, extra bandwidth must again be found and the techniques described above must be applied. If bit stream 109(i) is a priority 2 bit stream, the techniques described for priority 1 bit streams may be employed, or if that is not possible, the bandwidth required for the bit stream may be reduced by outputting a minimal-sized repeat picture as described above until the panic condition is over or until overflow of SMB 507(i) threatens.

Where the problem is the threatened overflow of one or more SMB buffers 507, it may also be addressed by decreasing the bit rate at which the encoders 107 produce data. If the encoders 107 are co-located with statistical multiplexer 401, feedback from multiplexer 401 to the encoders may be used to do this. With this kind of feedback, there is no requirement that multiplexer 401 understand the inner workings of encoders 107. All that the signal to a given encoder 107(i) need indicate is that the encoder must reduce its output rate by some amount. Which encoders receive the signal can be determined in many fashions by multiplexer 401. One approach is to reduce the bit rate. (and therefore the image quality) in channels on the basis of their priority levels; another is to reduce the bit rate in all channels equally. Typically, taking bandwidth from other bit streams would be a short-term solution that would be employed until the encoding rate could be changed. In the preferred hardware embodiment, short-term panic management is done in central bitrate controller 1007, while long-term panic management is done in control processor 907.

Algorithm for Allocating Residual Bits

When each of the bit streams 109(i) has received its minimum bitrate and there is still bandwidth remaining in medium 207, this residual bandwidth B, is allocated among the bit streams in the preferred embodiment by allocating each bit stream 109(i) an additional bit rate $\Delta R(i)$ which is proportional to the difference between the maximum and minimum bit rates computed by TRC 413(i) for the bit stream. $\Delta R(i)$ is calculated in the preferred embodiment as follows:

$$\Delta R(i) = \frac{R_{max}(i) - R_{min}(i)}{\sum_i (R_{max}(i) - R_{min}(i))} \frac{Bc}{Tc}$$

In a preferred embodiment, all of the bit rates involved in the above computation are rounded to an integer number of packets per second.

CONCLUSION

The foregoing Detailed Description has disclosed to those skilled in the arts to which the invention pertains how to make and use apparatus for outputting a variable-rate bit stream which uses a model of a receiver of the bit stream and information from the bit stream to determine a rate at which the variable-rate bit stream must be output to avoid overflow or underflow in the receiver. The Detailed Description has further disclosed a multiplexer which employs the apparatus to multiplex a set of variable- rate bit streams onto a medium, has disclosed how such apparatus and multiplexers may be used with bit streams of video images that are encoded according to the MPEG-2 standard, and has given algorithms for the use of models of MPEG-2 receivers to compute rate requirements.

The Detailed Description has disclosed the best mode presently known to the inventors of implementing their apparatus and multiplexers which employ the apparatus; it will, however, be immediately apparent to those skilled in the arts to which the invention pertains that the invention may be employed with variable-rate bit streams other than those which are encoded according to the MPEG-2 standard and that many other implementations can be made which will incorporate the principles of the invention but employ different specific implementation techniques.

For these reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. An apparatus for controlling a rate at which a bit stream encoded at a variable rate is output, the apparatus comprising:

a queue for receiving and storing the bit stream;

a processor for applying a model of a receiver for the bit stream to information read from the bit stream to determine an output rate for outputting the bit stream;

a bit stream analyzer for analyzing at least timing information and picture size information in said bit stream; and output apparatus responsive to the output rate for outputting the bit stream from the queue.

2. The apparatus set forth in claim 1 wherein:

the processor determines the output rate such that the receiver of the model will neither overflow nor underflow.

3. The apparatus set forth in claim 2 wherein:

the processor is further responsive to a state of the queue and further determines the output rate such that the queue will not overflow.

4. The apparatus set forth in claim 3 wherein:

the processor further determines the output rate such that the queue will not underflow.

5. The apparatus set forth in any of claims 1 through 4 wherein:

the bit stream is a sequence of components, the components having varying lengths and each component including timing information indicating when the receiver must process the component and the model includes a current set of components which is the set of the components in the queue together with the set of the components that have been sent to but not yet processed by the receiver, the timing information for the components in the current set, the sizes of the components in the current set, and a size of a bit buffer in the receiver of the model.

6. The apparatus set forth in claim 5 wherein:

the components are digitally-encoded video images.

7. The apparatus set forth in claim 6 wherein:

the video images are encoded according to the MPEG-2 standard.

8. The apparatus set forth in claim 2 wherein:

the bit stream is a sequence of components, the components having varying lengths and each component including timing information indicating when the receiver must process the component;

the model includes a current set of components which is the set of the components in the queue together with the set of the components that have been sent to but not yet processed by the receiver, the timing information for the components in the current set, the sizes of the components in the current set, and a size of a bit buffer in the receiver of the model; and the processor determines the output rate for a given period of time by determining a minimum rate such that each component is output from the queue before the receiver must process the component and a maximum rate such that the total size of the components in the set of the components that have been sent to but not yet processed by the receiver does not exceed the size of the bit buffer in the receiver of the model.

9. The apparatus set forth in claim 8 wherein:

the processor increases the minimum rate for the given time period according to the number of bits that remain in the queue from a current component that is currently being output from the queue and the amount of time remaining until the current component must have been output from the queue and the processor decreases the maximum rate for the given time period as the total size of the components in the set of components that have been sent to the receiver and not yet processed approaches the size of the bit buffer in the receiver of the model.

10. The apparatus set forth in claim 1, further including a bandwidth portion controller coupled to said output apparatus.

11. The apparatus set forth in claim 10, wherein said bandwidth portion controller dynamically determines a variable portion of said bit stream to be output to a medium.

12. The apparatus set forth is claim 10, wherein said bandwidth portion controller is coupled to a plurality of output apparatus.

13. A method of dynamically determining an output rate at which a bit stream encoded at a variable rate is output to a receiver, the method comprising the steps of:

receiving and storing the bit stream in a queue;

analyzing said bit stream for at least timing information and picture size information;

in a processor, applying a model of the receiver to information read from the bit stream to determine the output rate; and outputting the bit stream from the queue at the output rate.

14. The method set forth in claim 13 wherein:

the output rate is determined such that the receiver of the model will neither overflow nor underflow.

15. The method set forth in claim 14 wherein the method further comprises the step of:

determining a state of the queue; and the step of determining the output rate further determines the output rate such that the queue will not overflow.

16. The method set forth in claim 15 wherein:

the step of determining the output rate further determines the output rate such that the queue will not underflow.

17. The method set forth in any of claims 13 through 16 wherein the bit stream is a sequence of components, the components having varying lengths and each component including timing information indicating when the receiver must process the component, the model includes a current set of components which is the set of the components in the queue together with the set of the components that have been sent to but not yet processed by the receiver, the timing information for the components in the current set, the sizes of the components in the current set, and a size of a bit buffer in the receiver of the model, and the step of determining the output rate is done for a given period of time and comprises the steps of determining a minimum rate such that the component is output from the queue before the receiver must process the component and determining a maximum rate such that the total size of the components in the set of the components that have been sent to but not yet processed by the receiver does not exceed the size of the bit buffer in the receiver of the model.

18. The method set forth in claim 17 wherein:

the step of determining the minimum rate increases the minimum rate for the given time period according to the number of bits that remain in the queue from a current component that is currently being output from the queue and the amount of time remaining until the current component must have been output from the queue and the step of determining the maximum rate decreases the maximum rate for the given time period as the total size of the components in the set of components that have been sent to the receiver and not yet processed approaches the size of the bit buffer in the receiver of the model.

19. The method set forth in claim 17 wherein:

the components are digitally-encoded video images.

20. The method set forth in claim 19 wherein:

the video images are encoded according to the MPEG-2 standard.

21. An apparatus for controlling a rate at which an encoder encodes a bit stream, the apparatus comprising:

a queue for receiving and storing the bit stream from the encoder;

a bit stream analyzer for analyzing at least timing information and picture size information in said bit stream; and a processor coupled to the bit stream and to the encoder for applying a model of a receiver for the bit stream to the information read from the bit stream to determine the rate at which the encoder encodes the bit stream.

22. The apparatus as set forth in claim 21, further including a bandwidth portion controller.

23. The apparatus as set forth in claim 22, wherein said bandwidth portion controller dynamically determines a variable portion of said bit stream to be output to a medium.

* * * * *